(12) United States Patent
Webber

(10) Patent No.: US 6,575,516 B2
(45) Date of Patent: Jun. 10, 2003

(54) TAILGATE RAMP AND LOAD LOCKING ACCESSORIES FOR A PICKUP TRUCK

(75) Inventor: Douglas S Webber, Whites Lake (CA)

(73) Assignee: J.W.F. Innovations Inc., Mahone Bay (CA)

(*) Notice: Subject to any disclaimer, the term of this patent is extended or adjusted under 35 U.S.C. 154(b) by 0 days.

(21) Appl. No.: 10/104,005

(22) Filed: Mar. 25, 2002

(65) Prior Publication Data
US 2002/0145300 A1 Oct. 10, 2002

(30) Foreign Application Priority Data
Apr. 6, 2001 (CA) .............................................. 2343485

(51) Int. Cl.[7] .............................................. B62D 25/00
(52) U.S. Cl. .......................................... 296/61; 14/69.5
(58) Field of Search ....................... 296/61, 57.1, 26.11, 296/26.1, 50, 62; 14/71.1, 69.5

(56) References Cited

U.S. PATENT DOCUMENTS

| | | | | |
|---|---|---|---|---|
| 3,510,015 A | * | 5/1970 | Roshaven | 296/61 |
| 3,511,393 A | | 5/1970 | Abromavage | 214/85 |
| 3,756,440 A | * | 9/1973 | Raap et al. | 296/61 |
| 4,003,483 A | * | 1/1977 | Fulton | 296/61 |
| 4,596,417 A | * | 6/1986 | Bennett | 296/61 |
| 4,668,002 A | * | 5/1987 | Hanson | 296/61 |
| 4,727,612 A | * | 3/1988 | Smith | 14/69.5 |
| 4,864,673 A | * | 9/1989 | Adaway et al. | 296/61 |
| 4,884,838 A | | 12/1989 | Slater | 296/180.1 |
| 4,923,360 A | * | 5/1990 | Beauchemin | 14/69.5 |
| 5,199,150 A | | 4/1993 | Mortenson | 29/436 |
| 5,244,335 A | * | 9/1993 | Johns | 296/61 |
| 5,380,145 A | * | 1/1995 | Czaplewski | 14/71.1 |
| 5,538,307 A | * | 7/1996 | Otis | 296/61 |
| 5,540,474 A | | 7/1996 | Holland | 296/61 |
| 5,634,228 A | * | 6/1997 | Johnston | 296/61 |
| 5,730,577 A | * | 3/1998 | Jones | 414/462 |
| 5,768,733 A | * | 6/1998 | Kneebone | 14/69.5 |
| 5,769,593 A | | 6/1998 | Buffaloe | 414/537 |
| 5,813,714 A | * | 9/1998 | Lipinski et al. | 296/61 |
| 5,971,465 A | | 10/1999 | Ives et al. | 296/61 |
| 5,988,725 A | | 11/1999 | Cole | 296/61 |
| 6,059,344 A | | 5/2000 | Radosevich | 296/61 |
| 6,099,233 A | * | 8/2000 | Craik | 14/71.1 |
| 6,158,798 A | * | 12/2000 | Stedtfeld et al. | 296/61 |
| 6,227,593 B1 | * | 5/2001 | De Valcourt | 296/61 |
| 6,250,874 B1 | * | 6/2001 | Cross | 296/61 |
| 6,267,082 B1 | * | 7/2001 | Naragon et al. | 14/69.5 |
| 6,338,515 B1 | * | 1/2002 | Munhall | 296/26.1 |
| 2002/0031422 A1 | * | 3/2002 | Schilling | 414/477 |

FOREIGN PATENT DOCUMENTS

| | | |
|---|---|---|
| CA | 1238156 | 6/1988 |
| CA | 1298943 | 4/1992 |
| CA | 2196952 | 8/1997 |
| DE | 2027396 | 12/1971 |
| GB | 2 321 232 | * 7/1998 |
| WO | WO 8906199 | 7/1989 |

* cited by examiner

Primary Examiner—Kiran Patel
(74) Attorney, Agent, or Firm—Mario Theriault

(57) ABSTRACT

An elongated anchor rail is installed on the edge of a tailgate for retaining a tailgate accessory to the tailgate. The anchor rail has a flange portion with a flat surface partly covering an inside surface of the tailgate. The flange portion has longitudinal inside and outside edges. The anchor rail also has a channel portion projecting at right angle from the flange portion. The channel portion is at a distance from the outside edge, and forms with the flange portion a recessed seat adjacent to and along the outside edge. The channel portion further has a T-slot in the recessed seat facing toward the outside edge. When a tailgate accessory is mounted to the T-slot of the anchor rail, it is partly or completely included in the recessed seat. The tailgate accessories comprised in the tailgate attachment set include a pair of ramp ends and a number of lugs and hooks.

8 Claims, 6 Drawing Sheets

TAILGATE RAMP AND LOAD LOCKING ACCESSORIES FOR A PICKUP TRUCK

FIELD OF THE INVENTION

The present invention relates to tailgate attachments for pickup trucks and more particularly, the present invention pertains to a tailgate attachment and accessories to retain ramp members and other articles to the tailgate of a pickup truck.

BACKGROUND OF THE INVENTION

Portable ramps are commonly used for loading a garden tractor, a snowmobile, an all-terrain vehicle and equipment of the like into the box of a pickup tuck. The upper ends of the ramp boards are generally secured to the tailgate of the pickup truck to prevent accidents that can be caused by the slipping of a ramp board when equipment is being moved in or out of the truck box.

Pickup trucks are also used to carry materials of all sorts and shapes and often slender objects that are longer than the truck box. These long objects are generally laid against the edge of the closed tailgate and extend at the back of the truck box. These objects are susceptible of sliding from side to side when the truck is driving along and therefore they must be secured to the truck box whenever possible to avoid damaging the truck box or losing the objects along a roadway.

In other more casual applications, pickup trucks are used to carry bags containing groceries or other household articles and supplies. Ideally, these bags must be secured to the truck box to avoid moving about in response to the truck's movements and scattering the content of the bags inside the truck box.

Accordingly, it should be appreciated that there are advantages in providing tailgate attachments and accessories that can be used in various ways and purposes related to the utility of a pickup truck.

The tailgate attachments of the prior art are generally made for a single purpose, that is for holding one or more ramp members to the tailgate. When the ramp members are not used, the tailgate attachments are either carried loose inside the truck box or stowed away with the ramp members. Similarly, other tailgate ramp attachments available commercially are mounted permanently to the tailgate and do not enhance the practicability of the tailgate when the ramp members are not used.

Examples of tailgate ramp systems of the prior art are illustrated and described in the following documents:

U.S. Pat. No. 3,510,015 issued on May 5, 1970 to Harold L. Roshaven. This ramp system comprises a pair of ramp members having hooks on their upper ends, and a pair of support members having U-shaped straps for retaining the hooks of the ramp members. The support members are clamped onto the tailgate by transversely encircling a major portion of the tailgate.

U.S. Pat. No. 3,756,440 issued on Sep. 4, 1973 to joint inventors Gerald G. Raap and Donald F. Kutz describes a pair of ramp members which are pivotally connected to a round bar. The round bar is permanently affixed to the upper edge of the tailgate.

U.S. Pat. No. 4,884,838 issued on Dec. 5, 1989 to Frank W. Slater describes another ramp member attached to an elongated cap covering the upper edge of a tailgate. The cap is permanently fastened to the upper edge of the tailgate with screws.

U.S. Pat. No. 4,923,360 issued on May 8, 1990 to Phillippe J. Beauchemin illustrates a collapsible tailgate ramp which has an upper end pivotally connected to the upper edge of a tailgate.

U.S. Pat. No. 5,971,465 issued on Oct., 26, 1999 to Michael Ives et al. discloses a C-shaped angle iron which extends over the edge of a tailgate and is secured to the latch bolts of the tailgate. The angle iron has a round bar affixed to it to retain the ends of ramp members.

A last example of a portable tailgate ramp of the prior art is illustrated in Canadian Patent 1,071,811 issued on Feb. 19, 1980 to Lucien Leduc. The ramp described in this document has a pair of pins extending from an upper end thereof. These pins are engaged in corresponding holes through the tailgate.

Although the tailgate accessories of the prior art deserve undeniable merits and each constitutes an advance in the science of a specific field, it is believed that there continues to be a need for a better tailgate attachment and related accessories which can be used in a variety of ways and purposes to enhance the utility of a pickup truck.

SUMMARY OF THE INVENTION

In the present invention, however, there are provided a tailgate attachment and load locking accessories, referred to hereinafter as the tailgate attachment set, for retaining ramp members to a tailgate in a horizontal position and for retaining various objects to a tailgate in a horizontal or vertical position.

In accordance with one aspect of the present invention, there is provided an elongated anchor rail for installation on an edge of a tailgate for retaining a tailgate accessory to the tailgate. The anchor rail has a flange portion with a flat surface for partly covering an inside surface of a tailgate. The flange portion has longitudinal inside and outside edges. The anchor rail also has a channel portion projecting at right angle from the flange portion. The channel portion is at a distance from the outside edge and forms with the flange portion a recessed seat adjacent the outside edge. The channel portion further has a T-slot in the recessed seat facing toward the outside edge. When a tailgate accessory is mounted to the T-slot of the anchor rail, it is partly or completely included in the recessed seat.

The use of the anchor rail comprised in the tailgate attachment set according to the present invention is advantageous in many ways, and especially because one or more tailgate accessories can be mounted to, and left on the anchor rail between uses without hindering the function of the tailgate for various other purposes.

In accordance with a second aspect of the present invention, the anchor rail has a lip portion along the outside edge for covering an edge of a tailgate, and a web joining the upper edge of the channel portion and the inside edge. The channel portion and the lip portion extend at least about one inch from opposite sides of the flange portion, thereby providing the anchor rail with a substantial moment of inertia relative to the tailgate. When the anchor rail is installed on a tailgate, it stiffens the tailgate and prevents the edge of the tailgate from being damaged from a firm handling of objects in and out of the pickup truck.

Furthermore, the web forms an angle of about 142° with the flange portion. The anchor rail is therefore usable as a wheel chuck to prevent a wheeled vehicle from inadvertently rolling off the tailgate.

In accordance with another aspect of the present invention, there is provided a pair of ramp members with ramp ends engaged in the T-slot of the anchor rail. Each of the ramp ends has a hook lip loosely engaged in the T-slot and a square edge supported in the recessed seat. The weight of an equipment moving on the ramp members is transmitted to the tailgate through the square edge and the recessed seat without applying any bending stress on the hook lip.

In yet another aspect of the present invention, a number of lugs are mounted to the T-slot of the anchor rail and are usable to secure elongated objects to the edge of a tailgate. The lugs are included in the recessed seat and are selectively left on the anchor rail during the use of other tailgate accessories.

In a further aspect of the present invention, there is provided one or more hook members engaged in the T-slot and extending over the anchor rail for retaining one or more bags to a tailgate in a vertical position.

In accordance with yet a further aspect of the tailgate ramp attachment set according to the present invention, the components thereof are manufacturable by an extrusion process at a reasonable cost, thereby making such tailgate attachment set economically available to the public.

BRIEF DESCRIPTION OF THE DRAWINGS

The preferred embodiment of the present invention will be further understood from the following description, with reference to the drawings in which.

DETAILED DESCRIPTION OF THE PREFERRED EMBODIMENT

Figure 1:
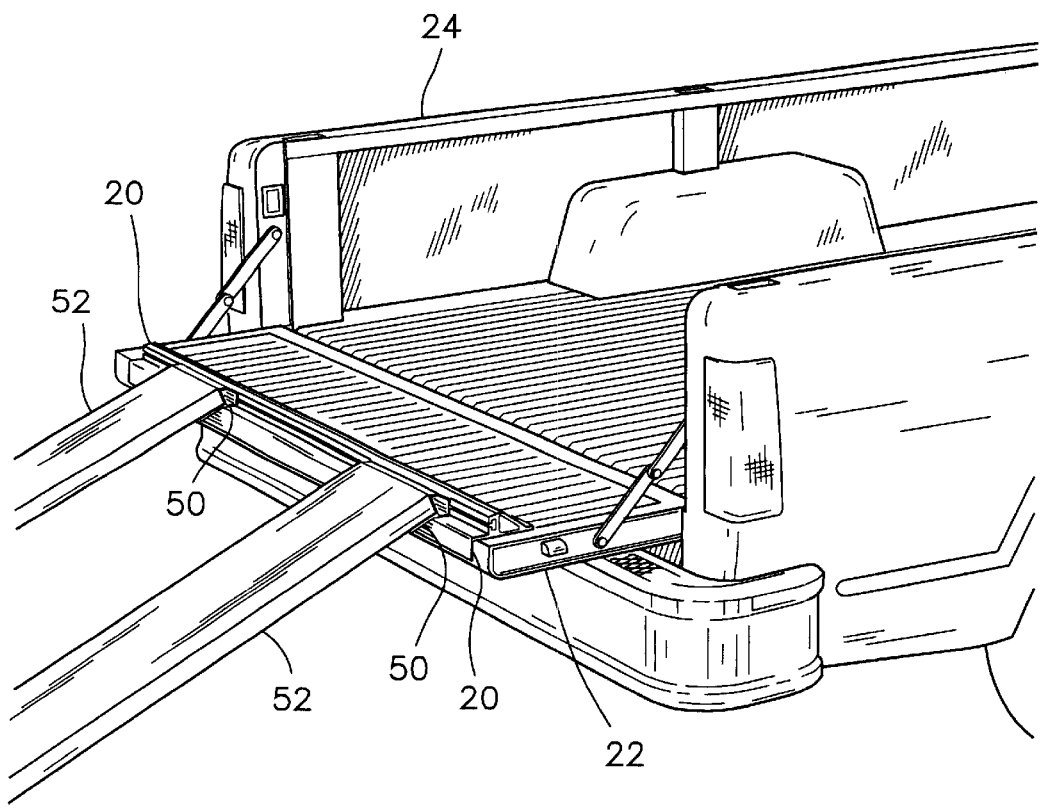
FIG. 1 is a perspective view of a tailgate ramp system which constitutes a first feature of the tailgate attachment set according to the preferred embodiment of the present invention.
Figure 2:
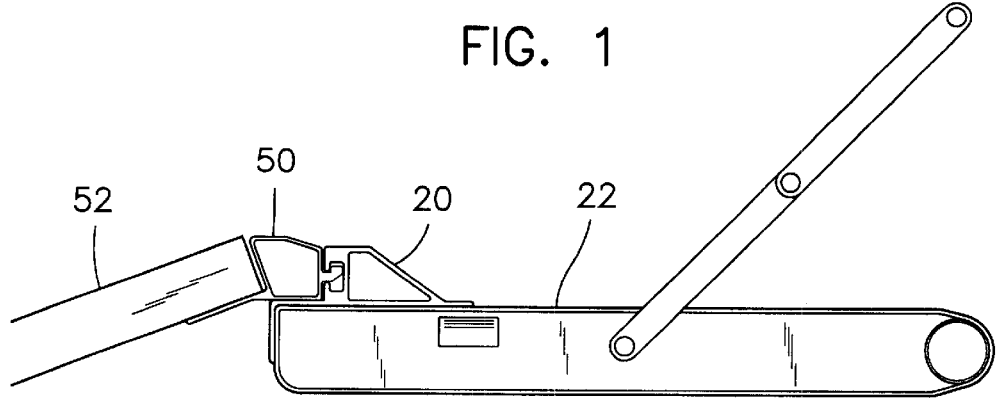
FIG. 2 is a partial side view of the tailgate ramp illustrated in FIG. 1.

The tailgate attachment set according to the preferred embodiment of the present invention comprises various elements that can be used to form a tailgate ramp, a wheel chuck on a tailgate, a tailgate stiffener, a first and second types of load retaining devices, and a sliding safety bar anchor. It will be appreciated that the elements of one feature may be combined with the elements of another feature to obtain other advantageous results which are not described herein. Therefore, the following disclosure shall not be interpreted as a limitation in the possible arrangements of the described elements. Accordingly, the present disclosure is to be considered as an example of the principles of the invention and is not intended to limit the invention to the embodiment illustrated and described.

Referring firstly to FIGS. 1–6, the tailgate attachment set according to the preferred embodiment will be described. The basic element of the tailgate attachment set consists of an anchor rail 20 which is affixed to the edge of a tailgate 22 of a pickup truck 24. The anchor rail 20 extends along the edge of the tailgate 22 and is slightly shorter than the width of the tailgate. All the structural features of the anchor rail 20 have a common dimension along the length of the anchor rail 20 such that it can be manufactured by an extrusion process. In the preferred embodiment, the anchor rail is made of an aluminum extrusion and has an anodized surface. The preferred anchor rail 20 has a flange portion 30 having a width 'A' of about 3.7 inches, and a lip portion 32 which extends substantially at right angle from the flange portion 30 a distance 'B' of about 1.4 inches. The lip portion 32 defines the exposed or outside edge 34 of the anchor rail 20. The inside edge of the anchor rail 20 is shown as label 36. The anchor rail 20 is affixed to the tailgate 22 by means of self tapping screws through the flange and lip portions thereof. These screws and their precise locations have not been illustrated for not being the focus of the present invention.

There is also provided a longitudinal channel portion 38 extending from the flange portion 30 opposite the lip portion 32. The channel portion 38 defines a T-slot 40 having a longer side perpendicular to the flange portion 30 and an opening facing toward the outside edge 34. The channel portion 38 is withdrawn from the outside edge 34 a distance 'C' of about one inch, thereby defining with the flange portion 30 a longitudinal square recessed seat 42 extending along the anchor rail 20.

The channel portion 38 extends from the flange portion 30 a height 'D' of about 1.25 inches. The upper edge of the channel portion 38 is joined to the inside edge 36 by web 44. This web 44 makes an angle 'E' of about 142° with the flange portion 30 thereby defining a wheel chuck on the tailgate for preventing a wheeled vehicle from inadvertently rolling back from the truck box. The height 'D' and the angle 'E' of the web 44 have been found to be convenient dimensions for preventing an unattended wheeled vehicle from rolling back, while allowing an easy loading and unloading of this wheeled vehicle into and from the pickup truck, using its own power.

The thickness 'F' of the flange portion 30, of the web portion 44, and of the lip portion 32 is about 0.1 inch for an anchor rail 20 which is made of aluminum. It will be appreciated that the anchor rail 20 can also be made of an extruded plastic, of fibreglass, or of a metal or alloy other than aluminum. In these cases, the dimensions of the anchor rail may differ from the above-mentioned specifications according to the mechanical properties of the material used.

When the anchor rail 20 is made of aluminum, the dimensions mentioned above, and especially the dimensions 'B' and 'D' have been found to be convenient to provide the anchor rail 20 with a substantial moment of inertia relative to the tailgate for increasing the bending strength of the tailgate. Therefore, one of the features of the anchor rail 20 is that it stiffens the tailgate on which it is installed.

Referring again to FIGS. 1–6, the tailgate ramp feature of the preferred embodiment will be described. In this feature, there are provided a pair of ramp ends 50 mounted to the upper ends of a pair of ramp boards 52. Each of the ramp ends 50 has an L-shaped hook lip 54 for engagement into the T-slot 40 of the anchor rail 20.

Each ramp end 50 has a right-angle seat 56 and holes 57 therein for fastening the ramp end 50 to the upper end of a ramp board 52 with screws. Adjacent the right-angle seat 56 there is provided a box-like portion 58 from which the L-shaped hook lip 54 extends. The box-like portion 58 has a square edge 60 having substantially the same dimensions as the recessed seat 42 on the anchor rail 20 such that the square edge 60 is fitly mountable into the recessed seat 42 when the ramp end 50 is hooked to the anchor rail 20. The L-shaped hook lip 54 extends from this square edge 60. The position of the hook lip 54 on the ramp end 50 is made to coincide loosely with the opening in the T-slot 40 when the square edge 60 is mounted in the recessed seat 42.

Figure 3:
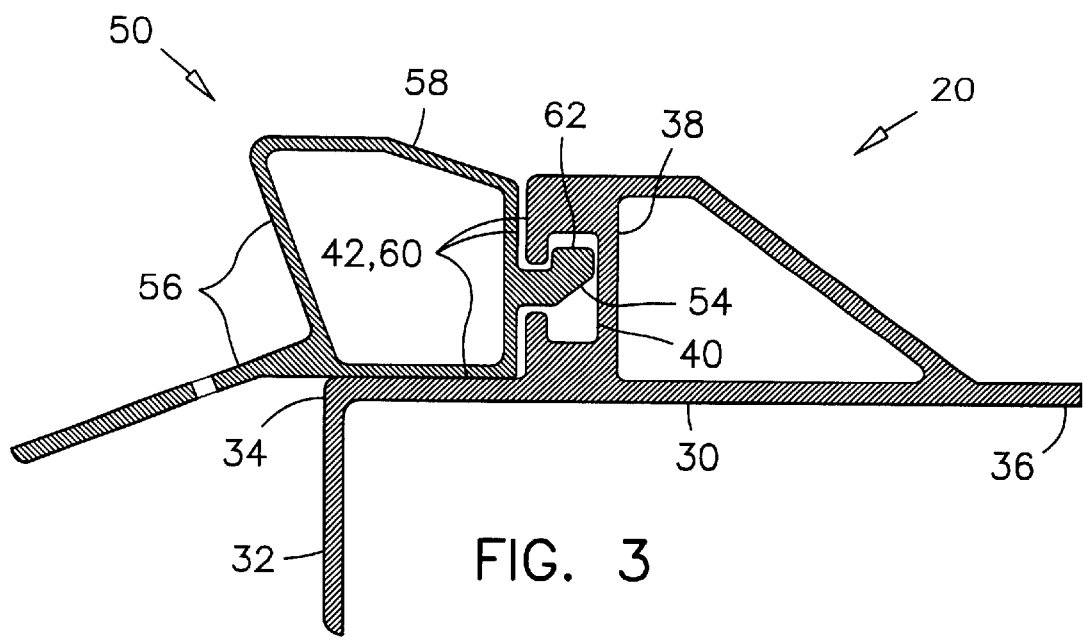
FIG. 3 is a combined cross-section view of a ramp end and the anchor rail comprised in the tailgate attachment set according to the preferred embodiment.
Figure 4:
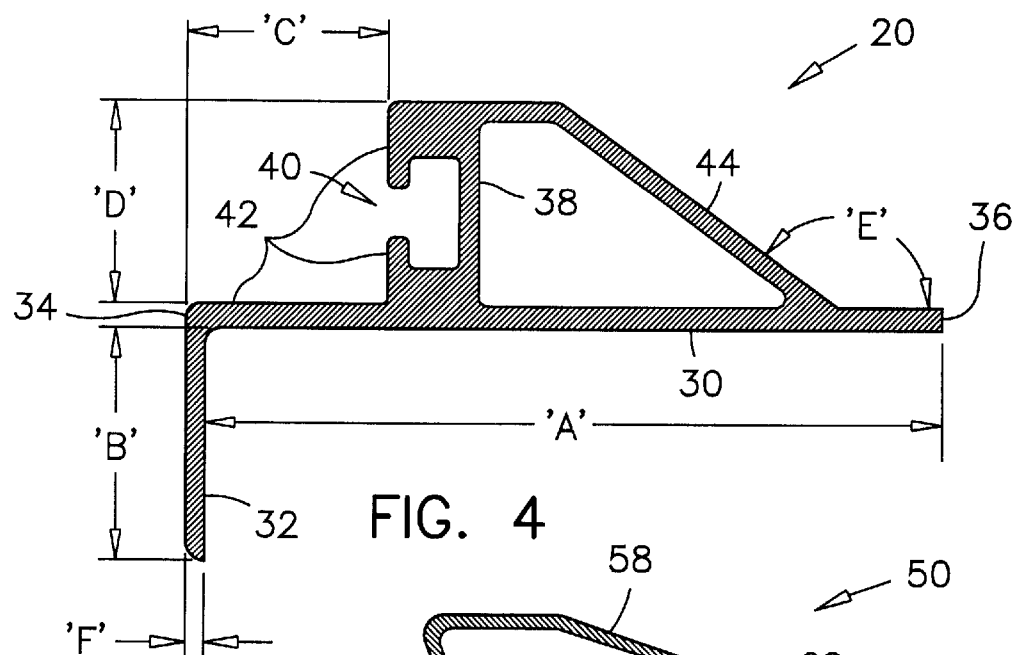
FIG. 4 is a cross-section view of the anchor rail alone.
Figure 5:
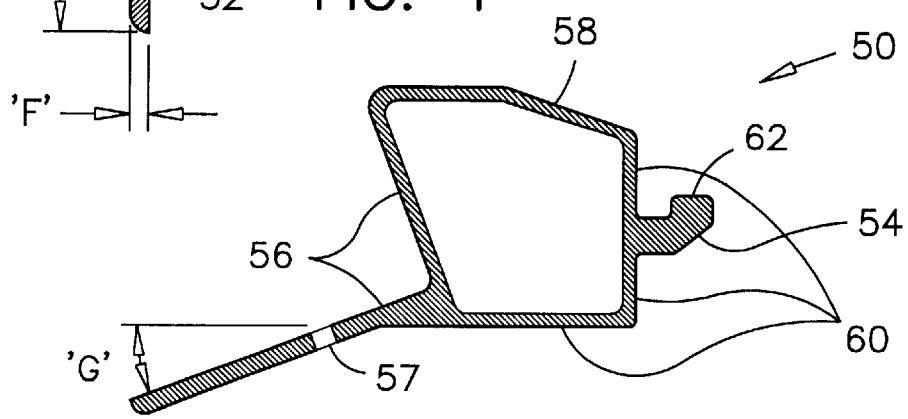
FIG. 5 is a cross-section view of the ramp end alone.
Figure 6:
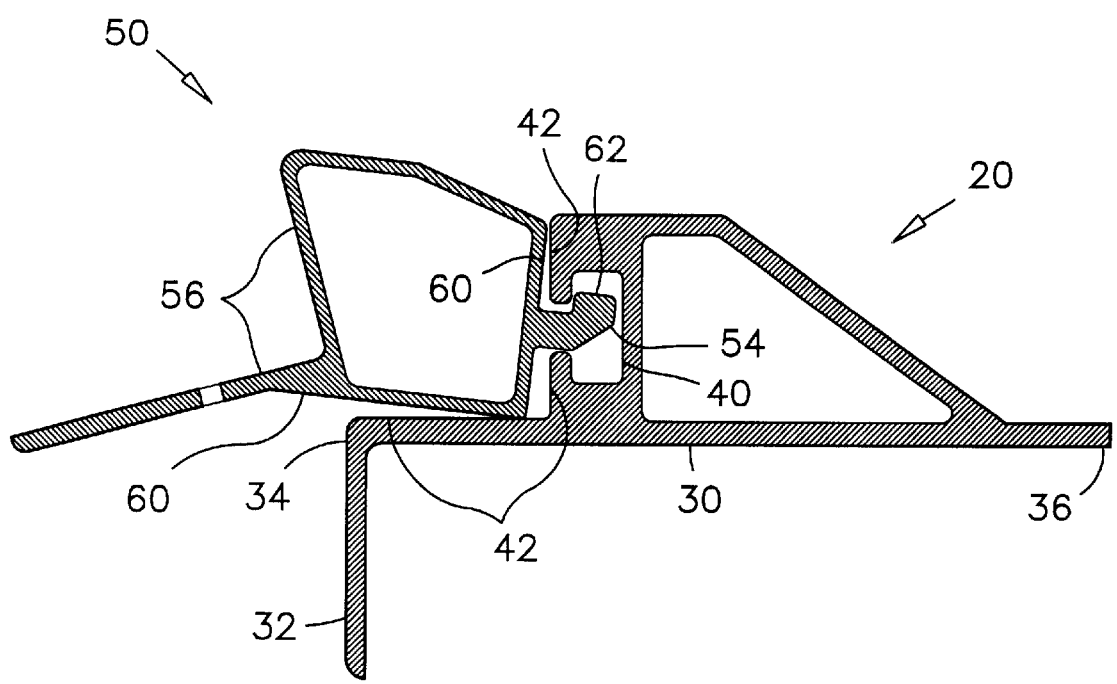
FIG. 6 is another partial side view of the tailgate ramp feature showing the articulation of the ramp end into the anchor rail.

As can be seen in FIGS. 3, 5 and 6, the L-shaped hook lip 54 has a finger portion 62 extending upward. The attachment of a ramp member 50, 52 to the anchor rail 20 is effected by raising and tilting the ramp board 52 with the ramp end 50 pointing down toward the anchor rail 20, as can be understood from the illustration in FIG. 6, and inserting the hook lip 54 into the T-slot 40 with the finger portion 62 extending in the upper part of the T-slot 40. This is effected while adjusting the ramp member 52 to fit the square edge 60 on the ramp end 50 into the recessed seat 42 of the anchor rail 20.

In the preferred embodiment, the right-angle seat 56 makes an angle 'G' of about 20°–22° with the horizontal portion of the square edge 60 and of the recessed seat 42. This angle has been found to be advantageous for moving a wheeled vehicle on the ramp members 52 with ease.

The above-described arrangement is also advantageous for transferring the load of the vehicle being moved on the ramp boards 52 to the anchor rail 20 with very little or no bending stress being applied to the hook lip 54. As can be appreciated, a vertical load on the ramp members is applied entirely to the recessed seat 42. The stress on the hook lips 54 of both ramp ends 50 is limited to tension forces applied substantially along the ramp boards 52.

The arrangement of the ramp ends 50 and of the anchor rail 20 also prevents to a certain extent the rotation of the ramp member 52 downward further than the specified angle 'G'. This rotation limiting feature provides an indication of a proper setting of the ramp members 52 on the ground. When the lower end of a ramp member 52 bears down lightly on the ground, the pickup truck should be moved to a location where both ramp members 52 rests firmly on the ground surface. In use, it is recommended that the pickup truck should be moved to a location where the square edge 60 on a ramp end 50 is tilted slightly upward in the recessed seat 42, as shown in an exaggerated manner in FIG. 6. This tilted mounting of the square edge 60 in the recessed seat 42 ensures that the ramp member 52 has an ideal slope of not more than the angle 'G'.

A movement of the ramp members 52 in an upward direction relative to the anchor rail 20 is possible, however, as was previously explained and illustrated in FIG. 6. In use, when the suspension of a pickup truck compresses under a load being moved on the ramps members 52, the relative movement between the ramp ends 50 and the anchor rail 20 is advantageous for preventing excessive stress in the connection of the ramp ends 50 to the anchor rail 20. Because of the loose mounting of the hook lip 54 in the opening of the T-slot 40, the relative movement mentioned above is effected while the load on the ramp end 50 continues to be applied to the recessed seat 42 on the anchor rail 20.

Figure 7:
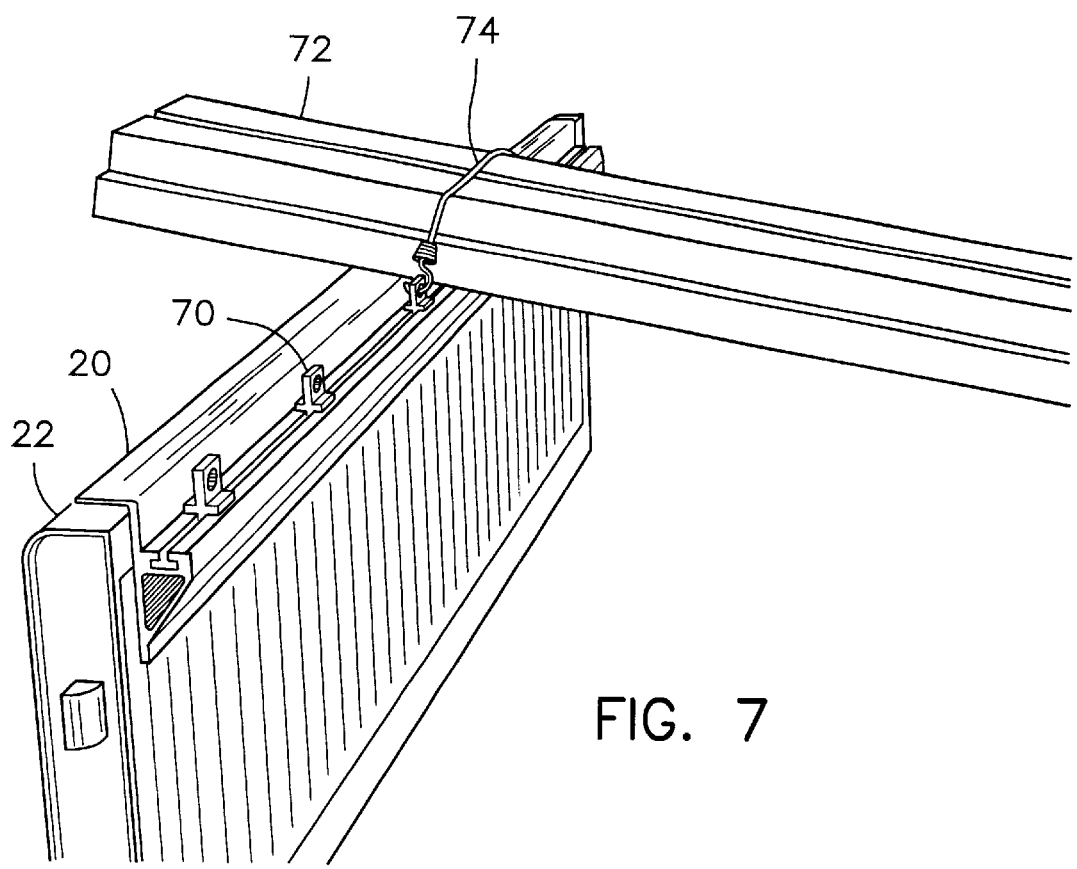
FIG. 7 is a partial perspective view of a load locking lug in use retaining a load of slender objects to a tailgate in a vertical position.
Figure 8:
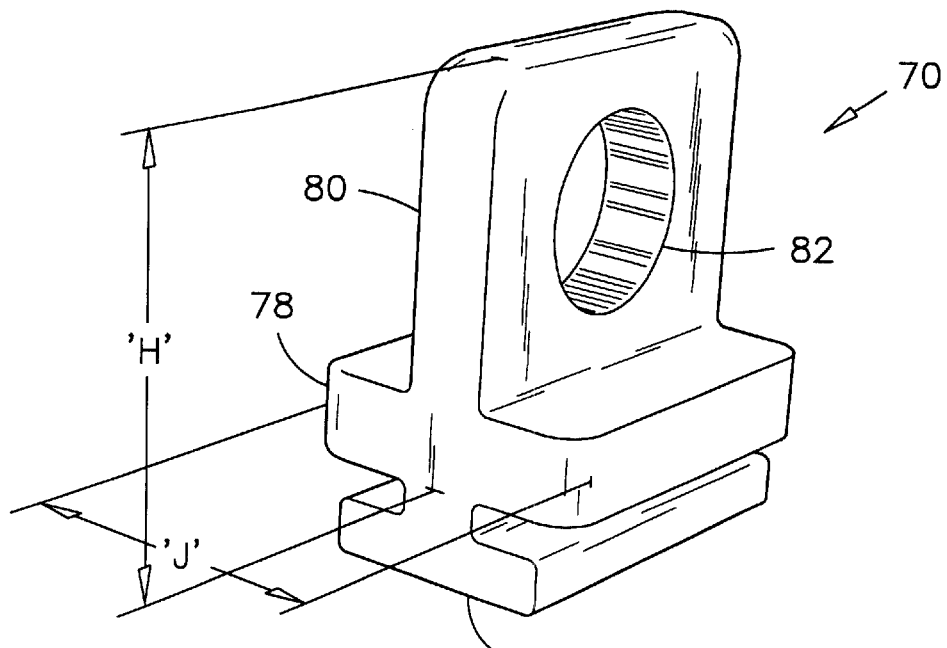
FIG. 8 is a perspective side, top and front view of one of the lugs shown in FIG. 7.

Referring now to FIGS. 7 and 8, the first load locking feature of the tailgate attachment set according to the preferred embodiment will be described. In this aspect of the preferred embodiment, the T-slot 40 in the anchor rail 20 is used to retain a number of lugs 70 which are usable to secure a load 72 to the edge of a closed tailgate 22 by means of a strap 74 or a rope for example. Each lug 70 has a T-like projection 76 which has dimensions for allowing a sliding fit thereof in the T-slot 40. The lug 70 also has a base 78 extending from the T-like projection 76 and a tab 80 extending from the base 78 opposite the T-like projection 76. The tab 80 has a hole 82 therein.

The height 'H' of the base 78 and of the tab 80 is less than the distance 'C' of the recessed seat 42 on the anchor rail 20 such that the lug 70 does not project beyond the edge of the tailgate 22. It is to be noted that the distance 'C' of the T-slot from the outside edge 34 is sufficient to include an accessory having a considerable height. Similarly, the width 'J' of the base 78 is less than the dimension 'D' on the anchor rail 20 such that the lugs 70 do not hinder the movement of a vehicle over the anchor rail 20. In use, a number of lugs 70 are inserted in the T-slot 40 and are left there for use when needed. Because the lugs are included within the dimensions 'C' and 'D' of the recessed seat, their presence on the anchor rail 20 does not prevent the attachment of the ramp ends 50 to the anchor rail 20 as was previously explained, and do not prevent a wheeled vehicle from rolling over the anchor rail 20. The lugs 70 are usable with the tailgate in the raised position as well as with the tailgate in the opened or flat position.

The T-like projection 76, the base 78, and the holed tab 80 have a common dimension such that the lug 70 can be manufactured of aluminum or plastic by an extrusion process.

Figure 9:
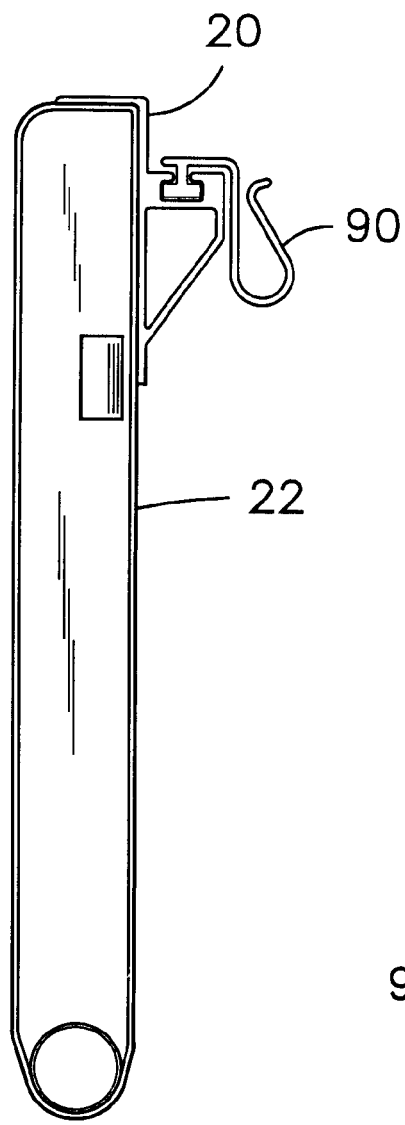
FIG. 9 is a side view of a tailgate in the vertical position showing a hook member used in a second load retaining application.
Figure 10:
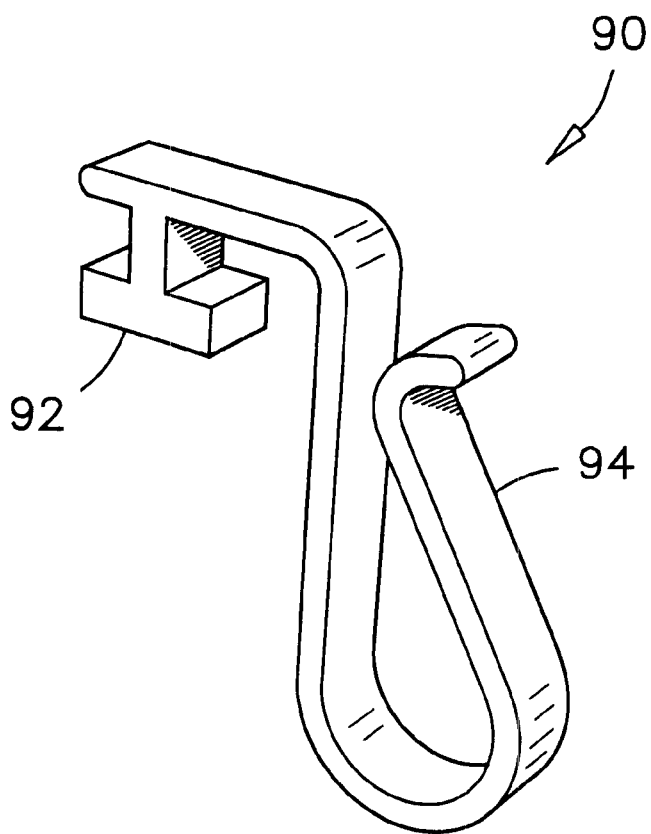
FIG. 10 is a perspective side, top and front view of the hook member shown in FIG. 9.

In another aspect of the tailgate attachment set according to the preferred embodiment, there is provided a hook member 90 which is mountable to the T-slot 40 in the anchor rail 20, as illustrated in FIGS. 9 and 10. The hook member 90 has a T-like projection 92 with dimensions to provide a sliding fit thereof into the T-slot 40. A hook portion 94 extends from the T-like projection 92. Again, the T-like projection 92, and the hook portion 94 have a common dimension such that the hook member 90 can be made of aluminum or plastic by an extrusion process.

In use, a number of hook members 90 are preferably mounted to the anchor rail 20 and left there for use when required. These hook members 90 are particularly advantageous for retaining plastic bags of the type used for carrying groceries. The handle openings of a bag are engaged onto the hook portion 94 and the bag is left hanging down along the tailgate with the bottom of the bag resting on the surface of the truck box.

The hook members 90 are also preferably left on the anchor rail 20, and moved along the anchor rail as required for use independently as a single feature or concurrently with the lugs 70.

Figure 11:
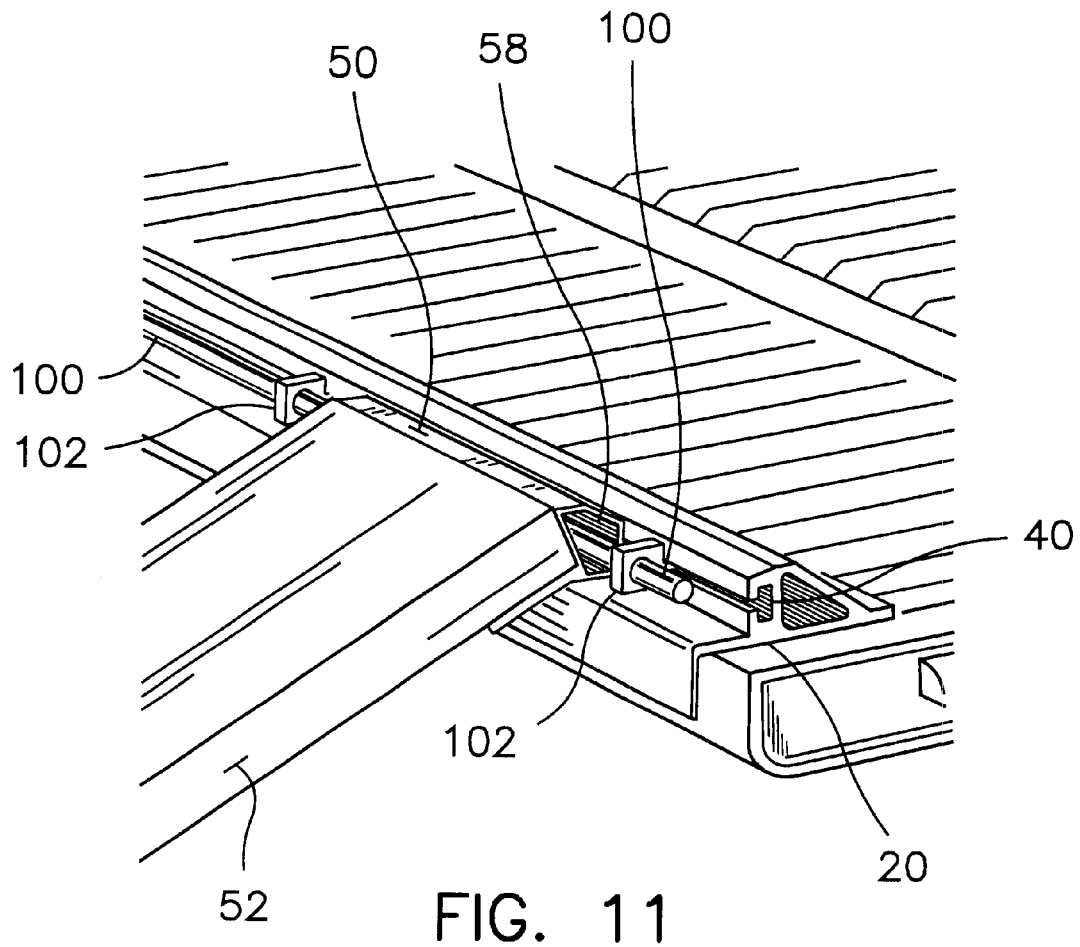
FIG. 11 illustrates a pair of sliding safety bar anchors in use securing a ramp end into the anchor rail.
Figure 12:
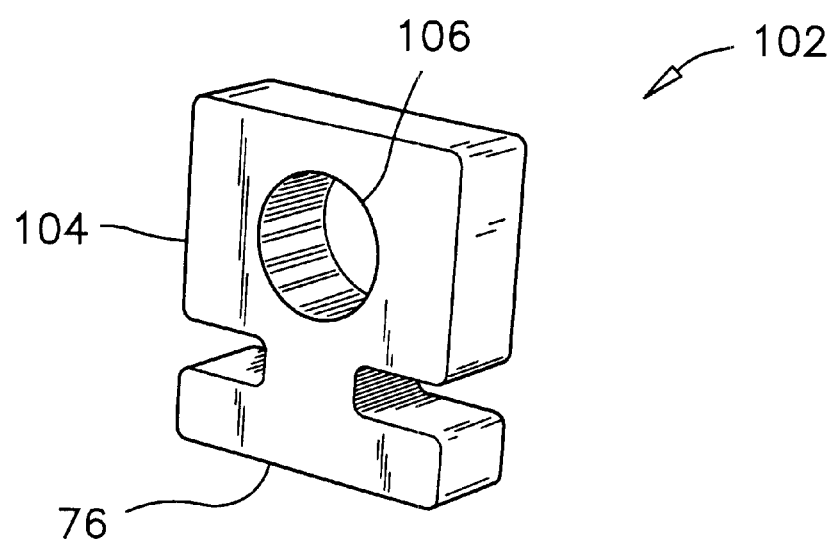
FIG. 12 is a perspective side view of a sliding safety bar anchor.

Referring now to FIGS. 11 and 12, a sliding safety bar 100 and sliding safety bar anchors 102 are illustrated therein. In some circumstances, it may be advantageous to secure the ramp members 52 to the anchor rail 20 in a manner which can prevent their disassembly from the anchor rail 20. For this purpose, there are provided in the tailgate attachment set, a sliding safety bar 100 and two or more sliding safety bar anchors 102 each having a T-like projection 76 with dimensions for allowing a sliding fit thereof in the T-slot 40. Each sliding safety bar anchor 102 has a tab 104 extending from the T-like projection 76 and a hole 106 in that tab. The axis of the hole 106 is parallel to the mounting axis of the T-like projection 76. The sliding safety bar 100 is preferably made of steel and the sliding safety bar anchors 102 are preferably made of aluminum.

In use, three or four sliding safety bar anchors 102 are preferably mounted astride the ramp members 52. The sliding safety bar 100 is inserted through the holes 106 in the sliding safety bar anchors 102 and through the box-like portion 58 of each ramp end 50, to further secure the ramp members 52 to the anchor rail 20.

As to other manner of usage and operation of the present invention, the same should be apparent from the above description and accompanying drawings, and accordingly, further discussion relative to these aspects would be considered repetitious and is not provided. However, while the above description provides a full and complete disclosure of the present invention, various modifications, alternate constructions and equivalents may be employed without departing from the true spirit and scope of the invention. Such changes might involve alternate components, structural arrangements, sizes, operational features or characteristics of the like. Therefore, the above description and accompanying illustrations should not be construed as limiting the scope of the invention, which is defined by the appended claims.

I claim:

1. A tailgate attachment set comprising an anchor rail for installation on an edge of a tailgate for retaining a tailgate accessory to said tailgate; said anchor rail comprising:
   a length;
   a flange portion having a flat surface for partly covering an inside surface of a tailgate, said flange portion having an inside and outside edges extending along said length;
   a lip portion extending at right angle from said flange portion along said outside edge for covering an edge of a tailgate;
   a channel portion projecting at right angle from said flange portion opposite said lip portion; said channel portion extending along, and at a distance from, said outside edge, thereby forming with said flange portion a longitudinal recessed seat adjacent said outside edge; said recessed seat having a T-slot therein with an opening facing toward said outside edge, and
   a tailgate accessory mounted to said T-slot and being partly included in said recessed seat.

2. The tailgate attachment set as claimed in claim 1, wherein said tailgate accessory comprises a ramp end having means for attachment to a ramp member and a hook lip engaged in said T-slot.

3. The tailgate attachment set as claimed in claim 2, wherein said ramp end comprises a square edge adjacent said hook lip and said square edge has dimensions similar to said recessed seat.

4. The tailgate attachment set as claimed in claim 3, wherein said means for attachment to a ramp member comprises a right-angle seat making an angle of between about 20° and about 22° with said recessed seat.

5. The tailgate attachment set as claimed in claim 2, wherein said hook lip has a L shape and a finger portion extending away from said right-angle seat and said square edge.

6. The tailgate attachment set as claimed in claim 1, wherein said tailgate accessory is a lug having a tab and a hole in said tab.

7. The tailgate accessory as claimed in claim 6, wherein said lug has a T-like projection; said tab extends from said T-like projection, and said tab and said T-like projection have a common dimension.

8. The tailgate accessory as claimed in claim 1, wherein said tailgate accessory is a hook.

\* \* \* \* \*